May 5, 1931. H. C. BECKMAN 1,803,319
DEVICE FOR SUSPENDING AND SUPPLYING CLEANING FLUID TO TEAT CUPS
Filed March 27, 1928. 2 Sheets-Sheet 1

WITNESS:

INVENTOR
Herman C. Beckman
BY
Busser and Harding
ATTORNEYS.

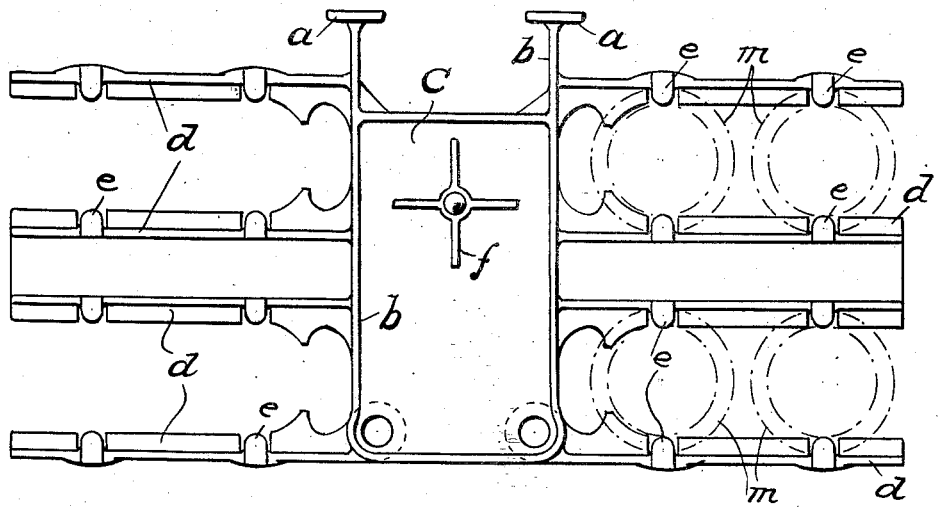

Patented May 5, 1931

1,803,319

UNITED STATES PATENT OFFICE

HERMAN C. BECKMAN, OF CHICAGO, ILLINOIS, ASSIGNOR TO THE DE LAVAL SEPARATOR COMPANY, OF NEW YORK, N. Y., A CORPORATION OF NEW JERSEY

DEVICE FOR SUSPENDING AND SUPPLYING CLEANING FLUID TO TEAT CUPS

Application filed March 27, 1928. Serial No. 265,127.

The object of the invention is to provide a device for the suspension of milking machine teat cups in such manner that the teat cups, the pulsator claw, if any, and the tubes forming part of the milking machine unit, may be filled with a cleaning fluid, preferably a sterilizing liquid, immediately after they have been in use and retain the cleaning fluid until they are again used, and from which the cleaning fluid may then be discharged.

A preferred embodiment of the invention is shown in the drawings, in which:—

Fig. 2 is a plan view.

Fig. 3 is an end view, partly broken away.

Fig. 4 is a detail view of the means for vertically adjustably positioning the holder for the cleaning fluid.

Fig. 5 is a detail view showing the means, cooperating with said adjustable means, for supporting the holder for the cleaning fluid.

Figure 1:
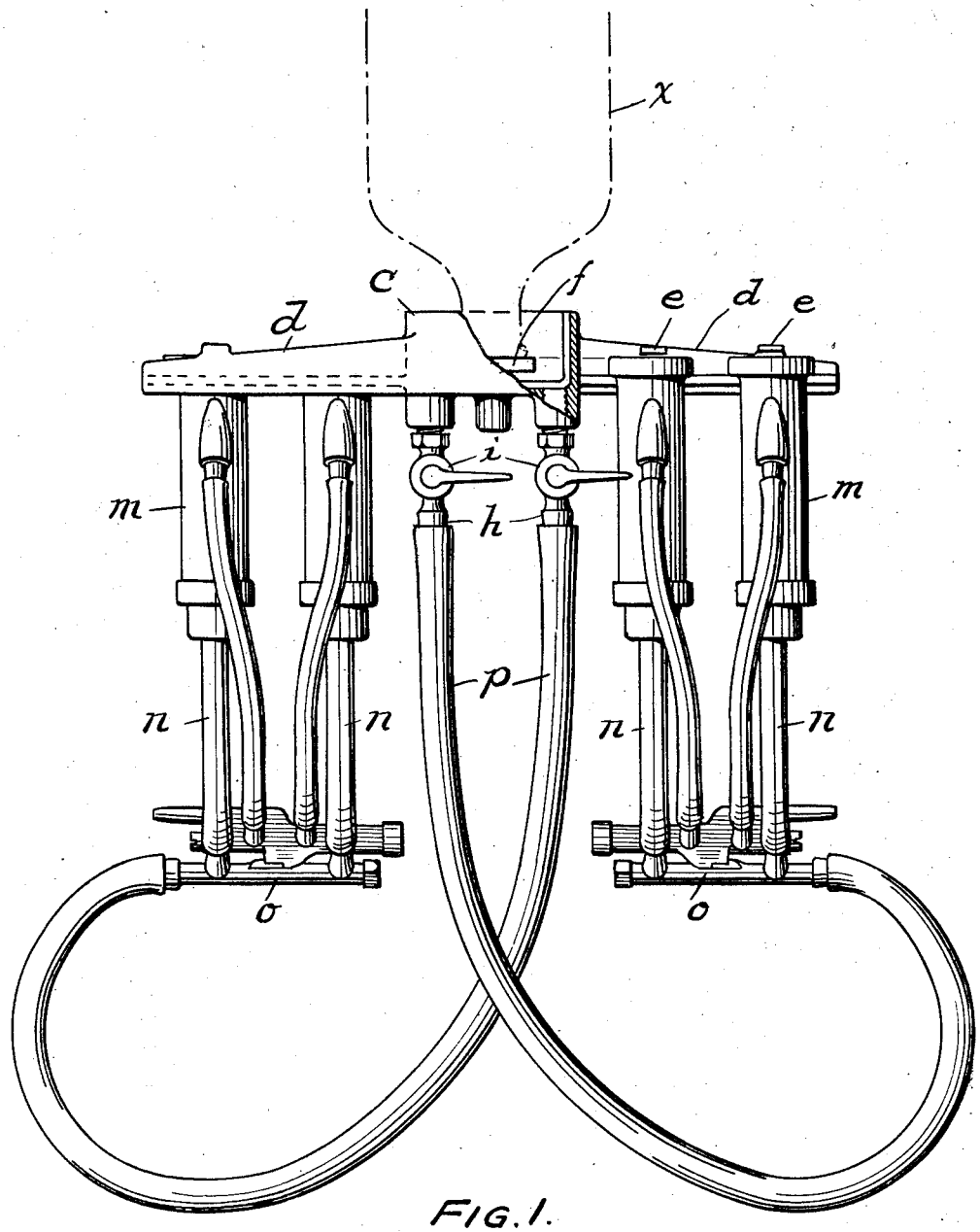
Fig. 1 is an end elevational view of the device with the teat cups suspended therein.

The structure comprises two upright plates $a$, $a$, lateral bars $b$, $b$, extending from the plates, longitudinal L-shaped bars $d$, extending outward from bars $b$, and a container $c$ for the solution which is to be introduced into the teat cups and tubes.

The plates $a$ are adapted to be secured to any convenient upright wall or support $z$, such as the wall of a barn. The container $c$ is positioned between bars $b$, $b$, which may form the side walls of the container.

The bars $d$ constituting the teat cup rack or racks may be arranged, as shown, in pairs, each pair being adapted to support between them two teat cups. Two pairs of bars may be arranged at each side of the container, so as to accommodate, on each rack, a complete set of teat cups.

The horizontal wings of the bars $d$ form ledges along which the flanged heads of the teat cups may be slid into the position that they are to occupy. The vertical wings of bars $d$ are provided with lateral flanges or ears $e$ overlying said ledges and under which the flanged heads of the teat cups slide and which serve to retain the teat cups in the position which they are intended to occupy.

Supported from the floor of the container $c$ is a support for a bottle or other holder $x$ for the cleaning solution. This support may comprise a series of radial wings $f$ at the top of a threaded stem $g$ which is adjustable on the container. The support $f$ is adapted to receive the bottle $x$ in inverted position, as shown in Figs. 1, 4 and 5. The support $f$ is located at such distance from the plates $a$ that a bottle, containing the cleaning solution, of standard size, when positioned on the support will rest, in vertical position, against the wall $z$. A bale $y$ (Fig. 5), pivoted to the wall $z$, is adapted to hold the bottle in this upright position. This bale may be swung up out of engagement with an empty bottle to allow it to be removed and may be swung down into retaining position when another full bottle is substituted.

In the front corner of the retainer $c$ are outlets communicating with nozzles $h$ provided with valve $i$.

The four teat cups of a set, and their connections may comprise, in addition to the teat cups $m$, milk tubes $n$ leading respectively therefrom, a claw $o$ containing a milk chamber with which the tubes $n$ connect, and a milk tube $p$ one end of which leads from said milk chamber and the other end of which is adapted for connection with one of the nozzles $h$.

In practice, the stopper is removed from a bottle $x$ of cleaning fluid and the bottle inverted and deposited on the bottle support $f$. The solution escapes from the bottle and fills the container $c$ to just above the level of the mouth of the bottle. Further escape of the solution is prevented by the pressure of the atmosphere balancing the column of solution and the partial vacuum in the bottle above the solution. At this time the valves $i$ are closed. The teat cups $m$ are then suspended, as shown and hereinbefore described, and the milk pipes $p$ are attached to the nozzles $h$. Valves $i$ are now opened and the solution escapes from container $h$ and flows through, and fills, the tubes $p$, the milk chamber of claw $o$, the tubes $n$ and the teat cups $m$. As the solution escapes from container $c$ it is replaced by solution from bottle $x$, thereby maintaining the liquid level in the container. The position of the teat cups on the rack should be such that their upper ends are just above the liquid level in the container, so as to prevent outflow of the solution from the open upper ends of the teat cups. By means of the vertically adjustable bottle support $f$, the vertical position of the bottle, and the level of liquid in the container, may be adjusted to definitely predetermine the level in accordance with the vertical position of the teat cups.

It frequently happens that when the rack is secured to the wall $z$, it is not quite level. In such case, if the bottle were positioned at a fixed height, the solution might overflow in the teat cups at a lower level. By providing a vertically adjustable support for the bottle, its vertical position may be so arranged that the liquid will just, or almost, fill the teat cups at the lowest level.

When it is desired to re-use the teat cups, the valves $i$ are closed, the pipes $p$ detached, and the solution allowed to escape from the teat cups, pipes $n$, claws $o$ and pipes $p$.

The above construction, among other advantages, insures against re-use of the solution and preserves, ready for use, fresh solutions for use when it is desired to again fill the same or other teat cups with the solution.

Having now fully described my invention, what I claim and desire to protect by Letters Patent is:

1. A device for holding teat cups and the tubes leading therefrom in position to allow a cleaning fluid to be supplied thereto comprising a container for the fluid, and a rack secured thereto and extending therefrom and in fixed relation thereto, said rack comprising a pair of ledges over which the top flanges of teat cups are adapted to slide and retainers adapted to overlie said flanges when the teat cups are in position on the ledges, and means to establish and cut off communication between the container and the teat cups and their tubes.

2. A device for holding two sets of teat cups and the two milk tubes connected and communicating respectively therewith in position to allow a cleaning fluid to be supplied thereto, comprising a central container having two outlets, racks extending horizontally from each side of the container, each rack comprising four bars arranged in pairs, the racks of a pair providing supporting guides along which the flanged tops of teat cups are adapted to slide, the two milk tubes of the two teat cup sets being respectively detachably connectible with the two container outlets, valves controlling the flow of fluid from the container to said tubes, and a vertically adjustable support, within the container, for an open-mouth fluid holder.

3. A device for holding teat cups and the tubes leading therefrom to be filled with a cleaning liquid and for supplying such fluid thereto and discharging it therefrom, which comprises a container for the fluid having a fluid outlet with which one of said tubes is adapted to be connected, a rack, secured thereto and in fixed relation with the container, adapted to support teat cups at a substantially predetermined level relative to the container and means for supplying fluid to the container and for maintaining in the container a definite depth of liquid during the flow of liquid therefrom to the teat cups.

4. A device for holding teat cups and the tubes leading therefrom to be filled with a cleaning liquid and for supplying such fluid thereto and discharging it therefrom, which comprises a container for the fluid having a fluid outlet with which one of said tubes is adapted to be connected and a rack, in fixed relation with the container, adapted to support teat cups at a substantially predetermined level relative to the container, and means to supply fluid to the container and to predetermine the fluid level therein relative to the level of the tops of the teat cups.

5. A device for cleaning teat cups and holding the milk tubes leading therefrom in position to allow a cleaning fluid to be supplied thereto, which comprises means to which said milk tubes are connectible and through which a cleaning fluid may be supplied, and a rack comprising a pair of ledges over which the top flanges of teat cups are adapted to slide and retainers adapted to overlie said flanges when the teat cups are in position on the ledges.

6. A device for supplying a cleaning fluid to teat cups comprising a fluid container, means to supply fluid thereto and maintain fluid therein at a predetermined level during outflow of fluid therefrom, means to support teat cups with their upper ends at a predetermined relation with said predetermined level, and means providing communication between said container and the interiors of the teat cups.

7. A device for holding teat cups and the tubes leading therefrom to be filled with a cleaning fluid and for supplying such fluid thereto and discharging it therefrom, which comprises a container for the fluid having a fluid outlet with which one of said tubes is adapted to be connected, a rack in fixed relation with the container and adapted to support teat cups, and a support, within the container and extending above the floor thereof, adapted to support an open-mouth fluid holder in inverted position at a predetermined level relative to the levels of the tops of the teat cups.

8. A device for holding teat cups and the tubes leading therefrom to be filled with a cleaning liquid and for supplying such fluid thereto and discharging it therefrom, which comprises a container for the fluid, means to supply fluid to the container, a teat cup supporting rack, said rack and container being so secured together as to maintain them in fixed relation, said rack being so positioned as to support the teat cups in such position that the upper ends thereof are at a substantially predetermined level relative to the floor of the container, the container having a fluid outlet with which one of said tubes is adapted to be connected, and means to open and close communication between the container and the said tubes and teat cups.

9. A device for holding teat cups and the tubes leading therefrom to be filled with a cleaning liquid and for supplying such fluid thereto and discharging it therefrom, which comprises a container for the fluid, means to supply fluid to the container, a teat cup supporting rack, said rack and container being so secured together as to maintain them in fixed relation, said rack being so positioned as to support the teat cups in such position that the upper ends thereof are at a substantially predetermined level relative to the floor of the container, the container having a fluid outlet with which one of said tubes is adapted to be connected, the last named tube being attachable to allow fluid to flow thereinto from such container and fill the tubes and teat cups and being detachable therefrom to allow discharge of fluid from the teat cups and tubes, and a valve controlling the flow of liquid from the container to the tube directly connected therewith and which is adapted, when such tube is connected with the container, to be opened to allow fluid to flow into such tubes and which is adapted to be closed prior to the disconnection of such tube from the container to allow the escape of said fluid from the teat cups and the tubes connected therewith.

10. A device for holding teat cups and the tubes leading therefrom to be filled with a cleaning liquid and for supplying such fluid thereto and discharging it therefrom, which comprises a container for the fluid, a teat cup supporting rack, said rack and container being so secured together as to maintain them in fixed relation, said rack being so positioned as to support the teat cups in such position that the upper ends thereof are at a substantially predetermined level relative to the floor of the container, the container having a fluid outlet with which one of said tubes is adapted to be connected, means to open and close communication between the container and the said tubes and teat cups, and a support within the container for an open-mouth fluid holder, said support being vertically adjustable to determine the fluid level within the container relatively to the levels of the tops of the teat cups.

In testimony of which invention, I have hereunto set my hand, at Chicago, Ill., on this twentieth day of March, 1928.

HERMAN C. BECKMAN.